United States Patent
Capper

(10) Patent No.: US 9,141,373 B2
(45) Date of Patent: Sep. 22, 2015

(54) SYSTEM AND METHOD FOR ACCELERATED SOFTWARE UPGRADES

(71) Applicant: Simon Francis Capper, San Jose, CA (US)

(72) Inventor: Simon Francis Capper, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/449,030

(22) Filed: Jul. 31, 2014

(65) Prior Publication Data

US 2015/0040115 A1  Feb. 5, 2015

Related U.S. Application Data

(60) Provisional application No. 61/860,445, filed on Jul. 31, 2013.

(51) Int. Cl.
  *G06F 9/44* (2006.01)
  *G06F 9/445* (2006.01)
  *H04L 29/08* (2006.01)

(52) U.S. Cl.
  CPC . *G06F 8/65* (2013.01); *H04L 67/10* (2013.01)

(58) Field of Classification Search
  None
  See application file for complete search history.

(56) References Cited

U.S. PATENT DOCUMENTS

| | | | |
|---|---|---|---|
| 7,340,638 B2* | 3/2008 | Nicholson et al. | 714/6.11 |
| 7,453,797 B2* | 11/2008 | Deval et al. | 370/218 |
| 7,673,131 B2* | 3/2010 | Azzarello et al. | 713/2 |
| 7,827,397 B2* | 11/2010 | McCoull et al. | 713/2 |
| 8,589,667 B2* | 11/2013 | Mujtaba et al. | 713/2 |
| 8,782,632 B1* | 7/2014 | Chigurapati et al. | 717/172 |
| 8,943,489 B1* | 1/2015 | Qu | 717/168 |
| 2007/0291727 A1* | 12/2007 | Hellum et al. | 370/345 |
| 2011/0153697 A1* | 6/2011 | Nickolov et al. | 707/827 |
| 2011/0302638 A1* | 12/2011 | Cha et al. | 726/6 |
| 2012/0023309 A1* | 1/2012 | Abraham et al. | 712/30 |
| 2012/0166618 A1* | 6/2012 | Dahod et al. | 709/224 |
| 2014/0033188 A1* | 1/2014 | Beavers et al. | 717/170 |

OTHER PUBLICATIONS

Chain-loading—GNU GRUB Manual 2.00 Located at—http://www.gnu.org/software/grub/manual/html_node/Chain_002dloading 2012.*

* cited by examiner

*Primary Examiner* — Don Wong
*Assistant Examiner* — Hossain Morshed
(74) *Attorney, Agent, or Firm* — Blakely, Sokoloff, Taylor & Zafman LLP

(57) ABSTRACT

A method and apparatus of a device that updates a software image for a network element is described. In an exemplary embodiment, a device receives a signal to update the network element with the new software image, where the network element includes a plurality of hardware forwarding engines and a control plane. The device further boots the control plane with the new software image, where the booting is accomplished without restarting the control plane. In one embodiment, the device boots the control plane by chain booting from a current software image to the new software image. The device additionally restarts and reconfigures the plurality of hardware forwarding engines. In a further embodiment, the device additionally prefills one or more queues in the hardware forwarding engines with keep-alive messages. These keep-alive messages are transmitted during the time that the control plane is being restarted. In a further embodiment, the hardware forwarding engines are reconfigured without restarting them.

21 Claims, 8 Drawing Sheets

SYSTEM AND METHOD FOR ACCELERATED SOFTWARE UPGRADES

RELATED APPLICATIONS

Applicant claims the benefit of priority of prior, provisional application Ser. No. 61/860,445, filed Jul. 31, 2013, the entirety of which is incorporated by reference.

FIELD OF INVENTION

This invention relates generally to data networking, and more particularly, to accelerating a software upgrade of a network element.

BACKGROUND OF THE INVENTION

A network element can include two different planes that are used to process network traffic, a control plane and a data plane including one or more hardware forwarding engines. The data plane receives, processes, and forwards network traffic using various configuration data (e.g., forwarding, security, quality of service (QoS), and other network traffic processing information). The control plane controls these processing functions of the data plane by configuring the data plane, managing data collected by the data plane, monitoring the data plane, and other management functions. The functions for each of the data and control planes are programmed by a software image that is stored on the network element. When the network element boots up, the software image is loaded and is used to program the data plane and control plane.

Periodically, the software image is updated. For example, the network element is upgraded to a new software image to add new features and/or fix problems with the current software image. Alternatively, the network image can be downgraded to a previous version of the software image. To change the software image, the network element loads the new software image, marks this new software image as the current software image, and reboots the network element. As the network element boots up, the new software image is loaded and programs the control and data planes of the network element.

A problem with this way of upgrading or downgrading the software image is that, by rebooting the network element, the network element is inoperable for a relatively long time. For example, rebooting the network element can cause the network element to be off-line for upwards of five minutes. During this off-line time, the data processing functions of the network element are inoperable. This can lead to an interruption of data networking services that rely on the network element.

SUMMARY OF THE DESCRIPTION

A method and apparatus of a device that updates a software image for a network element is described. In an exemplary embodiment, a device receives a signal to update the network element with the new software image, where the network element includes a plurality of hardware forwarding engines and a control plane. The device further boots the control plane with the new software image, where the booting is accomplished without restarting the hardware forwarding engines. In one embodiment, the device boots the control plane by chain booting from a current software image to the new software image. The device additionally restarts and reprograms the plurality of hardware forwarding engines after the control plane has restarted with the new software image. In a further embodiment, the device additionally prefills one or more queues in the hardware forwarding engines with keep-alive messages. These keep-alive messages are transmitted during the time that the new software image is being booted on the control plane.

In another embodiment, the device receives a signal to update the network element with the new software image, where the network element includes a plurality of hardware forwarding engines and a control plane. The device further boots the control plane with the new software image, where the booting is accomplished without restarting the hardware forwarding engines. In one embodiment, the device boots the control plane by chain booting from a current software image to the new software image. The device additionally updates the plurality of hardware forwarding engines, wherein the updating occurs without an interruption to a network processing function of the data plane. In one embodiment, the device updates the plurality of hardware forwarding engines by analyzing and re-programming the hardware tables for each of the plurality of hardware forwarding engines.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
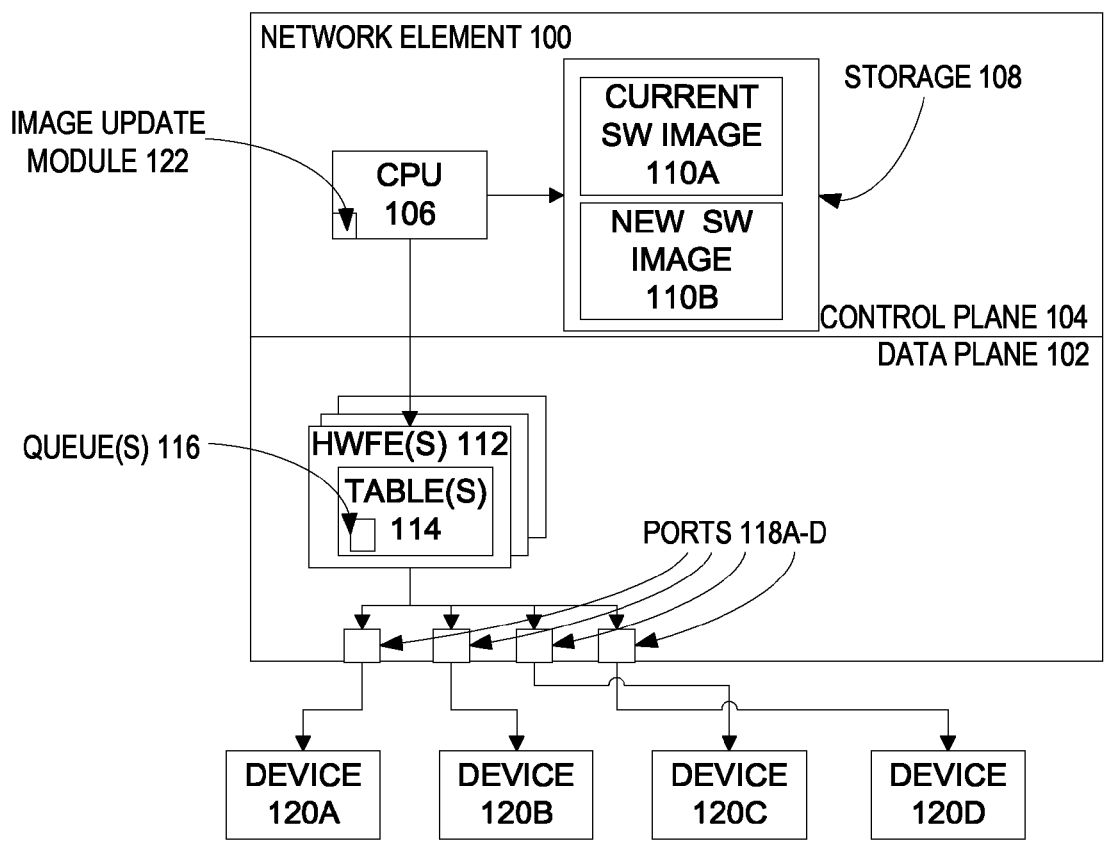
FIG. 1 is a block diagram of one embodiment of a network element that includes multiple software images.

A method and apparatus of a device that updates a software image for a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that updates a software image for a network element is described. In one embodiment, a device updates the software image by chain booting the control plane to the new software image and restarting the hardware forwarding engines; pre-filling one or more queues with keep-alive messages, chain booting the control plane to the new software image, and restarting the hardware forwarding engines; or chain booting the control plane to the new software image and re-programming the tables of the hardware forwarding engines without restarting them. Each of these embodiments can reduce the potential network interruption caused by the software image update to be 30 seconds or less.

In one embodiment, the device updates the software image for the device by chain booting the control plane to the new software image and restarting the hardware forwarding engines. In this embodiment, the device chain boots the control plane to the new software image. By chain booting the control plane, the device programs this control plane to be running with the new software image without interrupting the network data processing functions of the data plane. The device updates the data plane by restarting the hardware forwarding engines of the device and reprogramming the corresponding hardware tables. In this embodiment, a network service interruption can be 30 second or less.

In another embodiment, the device updates the software image for the device by pre-filling one or more queues the data plane with keep-alive messages, chain booting the control plane to the new software image, and restarting the hardware forwarding engines. In this embodiment, the device chain boots the control plane to the new software image. By chain booting the control plane, the device programs this control plane to be running with the new software image without interrupting the network data processing functions of the device data plane. In order to reduce the network service interruption while the control plane is chain booting the new software image, the device identifies the protocol or network services running on the network element that use short interval keep-alive messages. For each identified protocol or network service, the device determines the number of keep-alive message that would be transmitted in the time that the network element would have disrupted service and pre-fills an associated queue in the data plane with these messages prior to chain booting the new software image. In addition, the device configures the queues and/or messages so that these messages are transmitted as if the corresponding protocol or network service was not interrupted by the software image update. The device updates the configuration of the data plane by restarting the hardware forwarding engines of the device and reprogramming their hardware tables. In this embodiment, a network service interruption can be 30 second or less.

In a further embodiment, the device updates the software image for the device by or chain booting the control plane to the new software image and re-programming the tables of the hardware forwarding engines. In this embodiment, the device chain boots the control plane to the new software image. By chain booting the control plane, the device programs this control plane to be running with the new software image without interrupting the network data processing functions of the device data plane. In addition, the device analyzes each of the hardware tables of the hardware forwarding engines to determine the content and structure of that table. Using the analysis, the device re-programs that table so that the state of this table remains consistent during the re-programming of the table. By re-programming each table in a consistent manner, a network service or function of the device that relies on the table maintains a consistent behavior. In one embodiment, re-programming the hardware tables in this consistent manner can results in no downtime for these network services.

FIG. 1 is a block diagram of one embodiment of a network element 100 that includes multiple software images 110A-B. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network data, the data plane determines a destination address of that packet, looks up the requisite information for that destination in one or more tables stored in the data plane, and forwards the packet out the proper outgoing interface. The data plane 102 includes one or more hardware forwarding engines 112 that can each receive, process, and/or forward network traffic. In one embodiment, each hardware forwarding engine 112 includes one or more hardware tables 114. In one embodiment, the hardware tables 114 store configuration data, monitoring data, reporting data, and/or other management data for the hardware forwarding engine 112. The hardware table(s) 114 are further described below.

In one embodiment, the control plane 104 gathers the management data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to hardware table(s) 114. In one embodiment, the control plane 104 includes a central processing unit (CPU) 106 and storage 108. In one embodiment, the CPU 106 is a CPU that is used to control the processing functions of the network element 100. For example and in one embodiment, the active CPU 106 controls the configuration of the hardware forwarding engine(s) 112, retrieves the stored monitoring data, retrieves stored statistics, and/or performs other control functions. In one embodiment, the CPU 106 updates the software image for the network element 100. In this embodiment, storage 108 includes two software images 110A-B, which are a current software image 110A and a new software image 110B. In one embodiment, the current software image 110A is the software image that the network element 100 is currently running. In this embodiment, the new software image 110B is the same or a different software image than the current software image 110A. For example and in one embodiment, the new software image 110B can be a new version of the software image, a downgrade to an older software image version, or a reinstall of the current software image 110A. In one embodiment, an upgrade to a new software image can be used to add new features and/or bugs fixes for the current software image 110A. In another embodiment, a downgrade to an older software image version can be used to install a more stable software image. In a further embodiment, the software image update can be a re-install of a current software image 110A, which can be used in case the current software image 110A becomes corrupted. In one embodiment, the CPU 106 includes an update image module 122 that is used to update the network element 100 with the new software image 110B from the current software image 110A.

In one embodiment, the data plane 102 includes ports 118A-D. In this embodiment, the hardware forwarding engine(s) 112 are coupled to one or more of the ports 118A-D. In one embodiment, each of the ports 118A-D is used by the network element 100 to communicate network data with devices 120A-D. In one embodiment, device 120A-D is any type of device that can communicate network data with another device (e.g., a personal computer, laptop, server, mobile device (e.g., phone, smartphone, personal gaming device, etc.), another network element, etc.). In one embodiment, the devices 106A-B can be a virtual machine or can be a device that hosts one or more virtual machines. In another embodiment, the network element can be a virtual machine.

In one embodiment, the hardware table 114 is used to configure the hardware forwarding engine(s) 112. In one embodiment, the hardware table 114 is used to store configuration data, monitoring data, reporting data, statistics, and any other data the hardware forwarding engine uses or collects. In one embodiment, the hardware table 114 can include tables such as a routing table, MAC table, ACL, and/or other tables. For example and in one embodiment, the routing table stores running table entries for the one or more routing protocols that is used by the hardware forwarding engine, by using any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol known in the art. The MAC table is a table of MAC addresses known to the hardware forwarding engine and ports that these MAC address are associated with. In one embodiment, the MAC table is used for layer 2 forwarding. In one embodiment, the ACL consists of an ordered series of rules, where each rule has a match criterion and action. In this embodiment, the ACL is applied to the network data against these rules in order, and the action of the first rule that matches is taken. In one embodiment, the other tables is a set of one or more tables that is used to store statistics, monitoring data, other configuration data, stored events, management data, and/or other data the hardware forwarding engine uses or collects.

Figure 2:
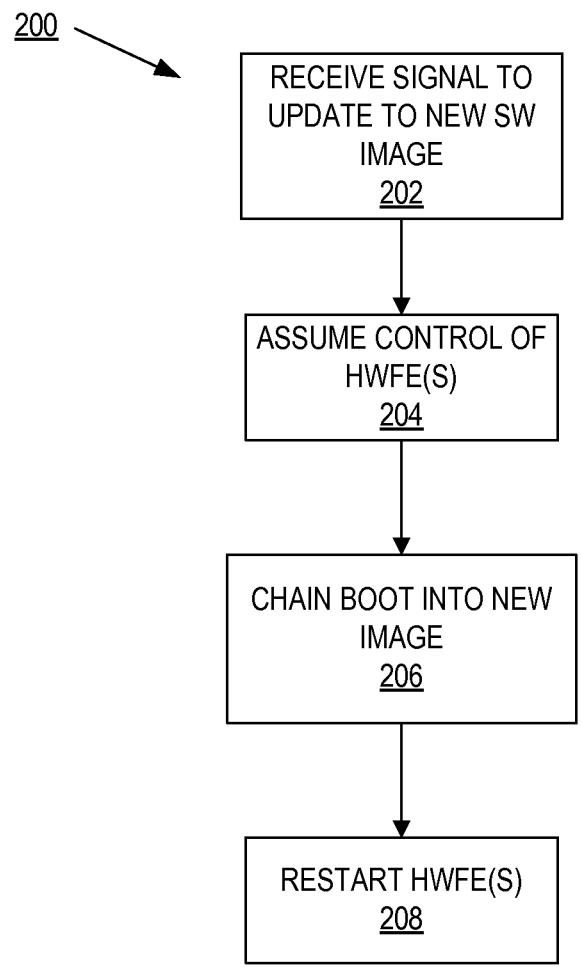
FIG. 2 is a flow diagram of one embodiment of a process to update a network element to a new software image.

FIG. 2 is a flow diagram of one embodiment of a process 200 to update a network element to a new software image. In one embodiment, process 200 is performed by an image update module to update the software image for a network element, such as image update module 122 of FIG. 1 above. In FIG. 2, process 200 begins by receiving a signal to update the network element to a new software image at block 202. In one embodiment, the new software image can be a new version of the software image, a downgrade to an older software image version, a reinstall of the current software image. In one embodiment, an upgrade to a new software image can be used to add new features and/or bugs fixes for current software image. In another embodiment, a downgrade to an older software image version can be used to install a more stable software image. In a further embodiment, the software image update can be a re-install of a current software image version, which can be used in case the running software image becomes corrupted. In one embodiment, the new software image is the image marked as current and the current software image is marked as the alternative software image.

At block 204, process 200 assumes control of the hardware forwarding engines. In one embodiment, once programmed by the software image and the associated hardware tables, the hardware forwarding engines can run in a "headless" mode, where the hardware forwarding engines process network data independently of the control plane. By assuming control of the hardware forwarding engines, process 200 can restart each of the hardware forwarding engines and rebuild the state of these hardware forwarding engines. Process 200 chain boots into the new software image at block 206. In one embodiment, chain booting is the process of loading another software image for the control plane while the network element is currently running and without restarting the control plane or network element. By chain booting the new software image, the control plane runs the new software image.

In one embodiment, chain booting the new software image allows the control plane to run the new software image without rebooting the network element. At this point, the data plane, including the hardware forwarding engines, is running the old software image. To get the data plane running the new software image, the hardware forwarding engines are restarted so that these engines use the new software configuration. At block 208, process 200 restarts the hardware forwarding engines. In one embodiment, process 200 restarts the hardware forwarding engine in unison, one-by-one, and/or in groups of one or more hardware forwarding engines. In one embodiment, restarting the hardware forwarding engines rebuilds the states for each hardware forwarding engine. In addition, by restarting, each hardware forwarding engine is programmed to use the instructions from the new software image as well as programming the data plane to be running with the new software image. In one embodiment, process 200 can take about 30 seconds to update the network element to the new software image, which is much less than simply rebooting the entire network element as described above. Thus, in one embodiment, process 200 reduces the interruption of the network data processing to about half a minute. This will reduce the scope of the network interruption for this network element and the network services that rely on the network element.

In FIG. 2, process 200 reduced the scope of network service interruption down to about 30 seconds. In addition, the network element did not experience a reboot. However, even a short disruption can cause network services to stop working. In one embodiment, a network service may use keep-alive messages between nodes using the service to determine that the link and/or other service resources are up and functioning normally. In one embodiment, a keep-alive message is a message sent by one device to another device to check that the service between the two devices is operating. The network service may require that these keep-alive messages be communicated on a short time frame, such as a few seconds. For example and in one embodiment, the network service using Link Aggregation Control Protocol (LACP) utilizes keep-alive messages between devices using this protocol on the order of seconds. In this embodiment, even an interruption of 30 seconds or less can disrupt this service. In one embodiment, prior to updating the software image of the network element, the network element can prefill the queues of the hardware forwarding engines with the keep-alive messages for protocols or network services that communicate keep-alive messages on a short time frame. In this embodiment, the network element creates the messages and inserts them in a queue so that these messages are transmitted on the correct schedule as if the network element did not experience a service disruption.

Figure 3:
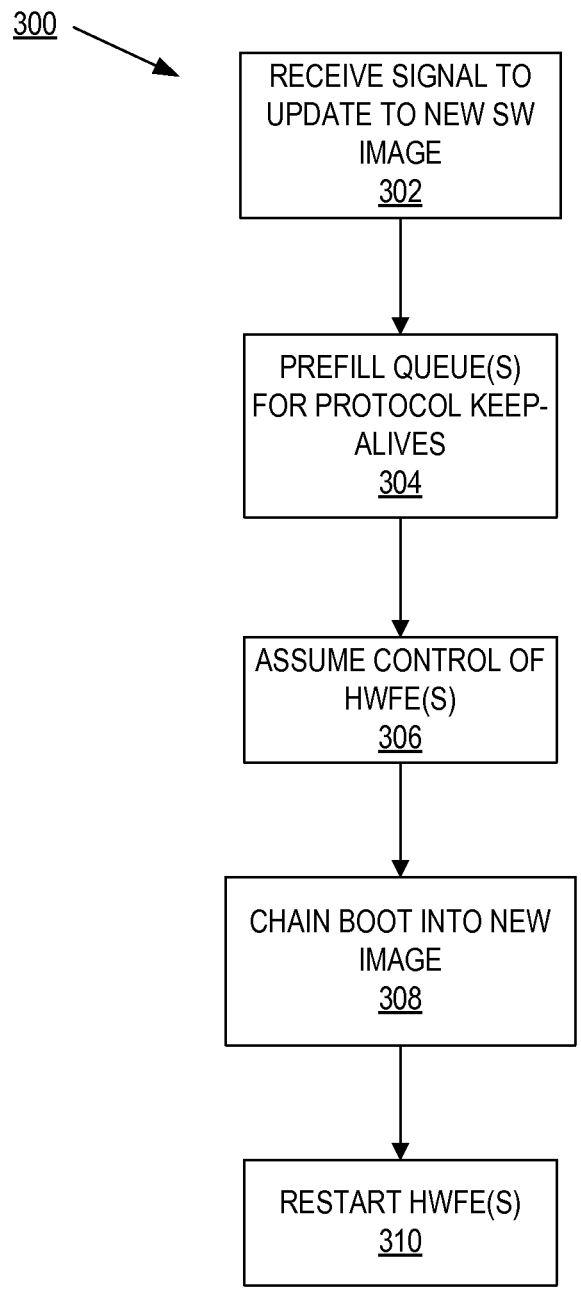
FIG. 3 is a flow diagram of one embodiment of a process to update a network element to a new software image by prefilling a queue with keep-alive messages.

In one embodiment, FIG. 3 is a flow diagram of one embodiment of a process 300 to update a network element to a new software image by prefilling a queue with keep-alive messages. In one embodiment, In FIG. 3, process 300 begins by receiving a signal to update the network element to a new software image at block 302. In one embodiment, the new software image can be a new version of the software image, a downgrade to an older software image version, a reinstall of the current software image as described in FIG. 2, block 202 above. In one embodiment, the new software image is the image marked as current and the current software image is marked as the alternative image.

At block 304, process 300 prefills one or more queues with protocol keep-alive messages. In one embodiment, process 300 identifies the protocol or network services running on the network element that use short interval keep-alive messages (e.g., LACP). Alternatively, process 300 identifies a network service or protocol that is scheduled to send and/or respond to a keep-alive message during the time that the data processing functions will be unavailable. For each identified protocol or network service, process 300 determines the number of keep-alive message that would be transmitted in the time that the network element would have disrupted service (e.g., 30 seconds). For example and in one embodiment, if a network service sends a keep-alive message every five seconds, process 300 would generate 6-7 keep-alive messages. With these messages, process 300 prefills a transmission queue in the hardware forwarding engines. In one embodiment, process 300 prefills a transmission queue in the in the hardware forwarding engines that corresponds to a port that will transmit the keep-alive messages. By prefilling the queue(s) with the keep-alive messages and subsequently transmitting them on a pre-determined schedule, the network element will appear as running normally during the software image update for these protocols. In one embodiment, prefilling the queues means that process 300 adds the keep-alive messages prior to these messages being transmitted and configures the keep-alive messages and/or the queue to be transmitted at the appropriate time. In one embodiment, process 300 tags each keep-alive message with the appropriate tags so that these messages are transmitted at the appropriate time. In another embodiment, process 300 configures the queue to transmit these messages at the appropriate time. For example and in one embodiment, assume a network service sends a keep-alive messages every five seconds. In this embodiment, process 300 prefills a queue with 6-7 messages and configures the messages and/or the queue to transmit those messages every five seconds. In one embodiment, the keep-alive messages could be a message that is sent to initiate the keep-alive process or can be a message that is sent in response to an anticipated keep-alive message.

At block 306, process 300 assumes control of the hardware forwarding engines as described in FIG. 2, block 204 above. By assuming control of the hardware forwarding engines, process 300 can restart each of the hardware forwarding engines and rebuild the state of these hardware forwarding engines. Process 300 chain boots into the new software image at block 308. In one embodiment, chain booting is the process of loading another software image for the control plane while the network element is currently running and without restarting the control plane. By chain booting the new software image, the control plane runs the new software image.

In one embodiment, chain booting the new software image allows the control plane to run the new software image without rebooting the network element. At this point, the data plane, including the hardware forwarding engines, is running the old software image. To get the data plane running the new software image, the control plane is restarted to use the new software image. At block 310, process 300 restarts the hardware forwarding engines. In one embodiment, process 300 restarts the hardware forwarding engine in unison, one-by-one, and/or in groups of one or more hardware forwarding engines. In one embodiment, restarting the hardware forwarding engines rebuilds the states for each hardware forwarding engine as described in FIG. 2, block 208 above. Similar as described in FIG. 2 above, process 300 can take about 30 seconds to update the running software image, which is much less than simply rebooting the network element as described above. Thus, in one embodiment, process 300 reduces the interruption of the network data processing to about half a minute. In addition, by prefilling one or more queues with keep-alive messages, one or more network services or protocols may not experience a service interruption. This will reduce the scope of the network interruption for this network element and the network services that rely on the network element.

Figure 4:
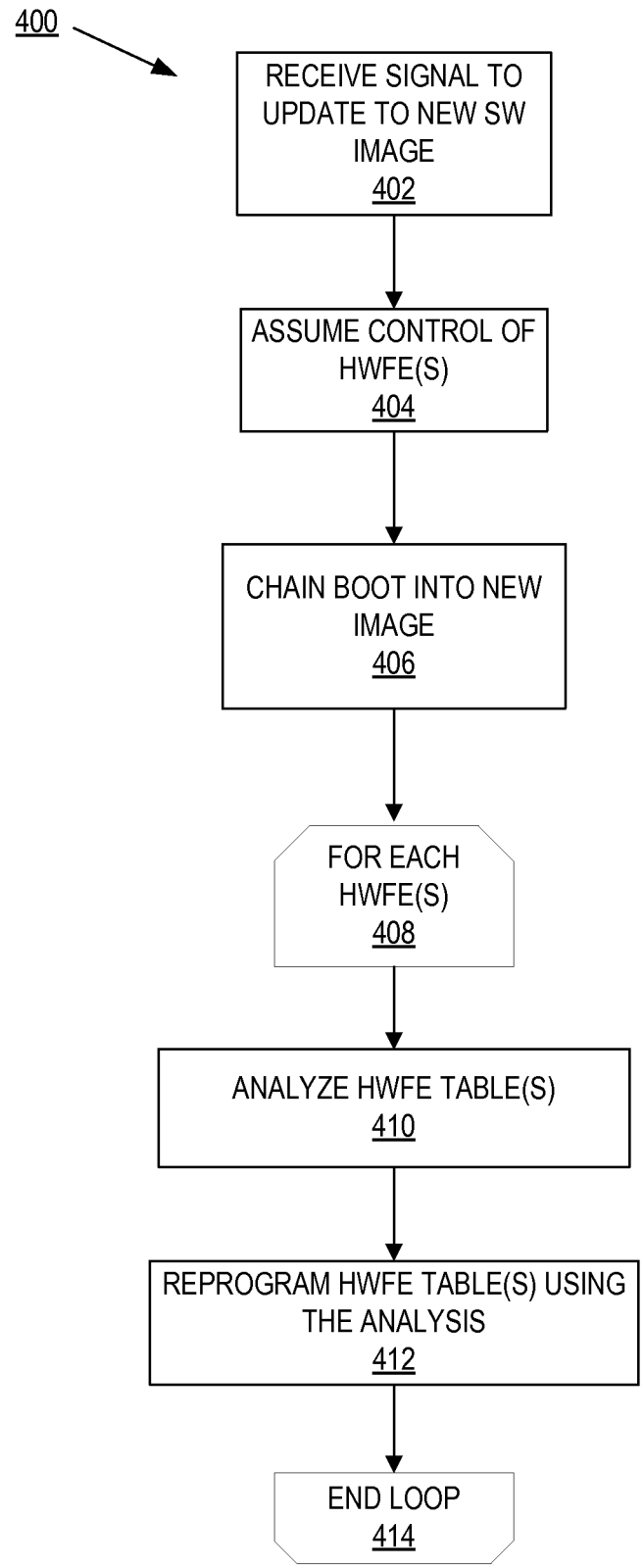
FIG. 4 is a flow diagram of one embodiment of a process to update a network element to a new software image by reprogramming the tables of the hardware forwarding engines.

As described above in FIGS. 2 and 3, these processes reduce the amount of time that the network element is unavailable down to about 30 seconds for some or all of the data processing functions of the network element. In another embodiment, the network element can update the software image of this network element without restarting the hardware forwarding engines. In one embodiment, instead of restarting the hardware forwarding engines as described above in FIGS. 2 and 3, the network element analyzes each of the hardware tables for each of the hardware forwarding engines and re-programs these hardware tables so that these hardware tables can be used with the new software image. FIG. 4 is a flow diagram of one embodiment of a process 400 to update a network element to a new software image by re-programming the tables of the hardware forwarding engines. In one embodiment, process 400 is performed by an image update module to update the software image for a network element, such as image update module 122 of FIG. 1 above. In FIG. 4, process 400 begins by receiving a signal to update the network element to a new software image at block 402. In one embodiment, the new software image can be a new version of the software image, a downgrade to an older software image version, a reinstall of the current software image as described in FIG. 2, block 202 above. In one embodiment, the new software image is the image marked as current and the current software image is marked as the alternative software image.

At block 404, process 400 assumes control of the hardware forwarding engines. In one embodiment, once programmed by the software image and the associated hardware tables, the hardware forwarding engines can run in a "headless" mode, where the hardware forwarding engines process network data independently of the control plane. In this embodiment, the process 400 assumes control of the hardware forwarding engines as described above in FIG. 2, block 204. By assuming control of the hardware forwarding engines, process 400 can analyze and re-program the hardware table for the hardware forwarding engines. Process 400 chain boots into the new software image at block 406. In one embodiment, chain booting is the process of loading another software image for the control plane while the network element is currently running. By chain booting the new software image, the control plane runs the new software image.

In one embodiment, chain booting the new software image allows the control plane to run the new software image without rebooting the network element. At this point, the hardware forwarding engines, is running the old software configuration. To get the hardware forwarding engines running the new software configuration, process 400 analyzes and re-programs each of the hardware tables for each of the hardware forwarding engines. In one embodiment, process 400 performs a processing loop (blocks 408-414) to update the hardware forwarding engines by analyzing and re-programming the hardware tables for each of the hardware forwarding engines. At block 410, process 400 analyzes each of the hardware tables for structure and content. In one embodiment, process 400 determines the order of the routing tables because each hardware table can be indeterminate. In one embodiment, this means that each of the hardware tables can have a random order. In this embodiment, the updating proceeds in the order of that table so that the table remains consistent while being used. For example and in one embodiment, for a routing table, process 400 determines the order of entries in a routing table. In this embodiment, if the routing table has entries 1, 2, 3, 4, 5 for the network addresses A, B, C, D, E, respectively, process 400 determines this order and uses this order when re-programming this routing table.

At block 412, process 400 re-programs each of the hardware table(s) using the analysis from block 410. In one embodiment, process 400 uses the structure and content determined in block 410 to re-program a hardware table. For example and in one embodiment, in the routing table example given above, process 400 would re-program this routing in the order and content of the current routing table. In this example, process 400 would re-program the routing table entry 1 for network address A, routing table entry 2 for network address B, routing table entry 3 for network address C, routing table entry 4 for network address D, and routing table entry 5 for network address E. In one embodiment, process 400 could program the entries in the order of 1-5, 5-1, or another order, so long that each routing table entry is being programmed with the corresponding content. In one embodiment, if process 400 does not program the table using the correct order and content, it is possible for the table have a different state in the middle of the update. For example and in one embodiment, if process 400 updates the routing table entry 1 with network address B, the resulting routing table would have network addresses B, B, C, D, E in entries 1-5. This intermediate state of the table would be different than the original table. Accordingly, a corresponding hardware forwarding engine may have different behavior when using intermediate state of the table. By programming the table in the correct order and using the correct structure and content, the hardware forwarding engine will have the same behavior during the re-programming of this table.

Figure 5:
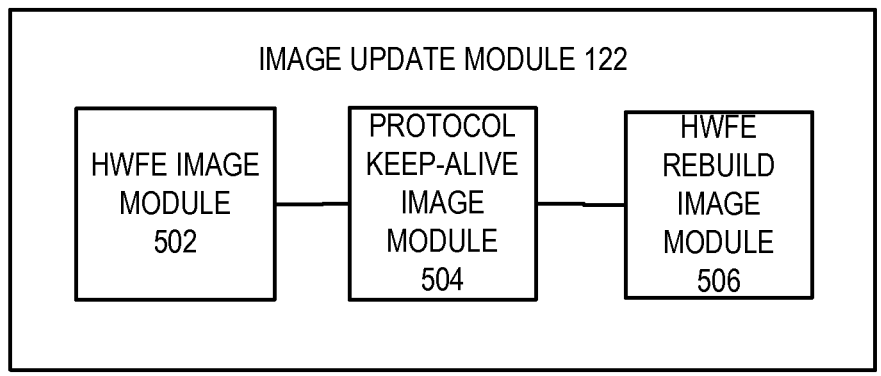
FIG. 5 is a block diagram of one embodiment of an image update module that updates a network element to a new software image.

FIG. 5 is a block diagram of one embodiment of an image update module 122 that updates a network element to a new software image. In one embodiment, the image update module 122 includes a hardware forwarding engine module 502, protocol keep-alive image module 504, and hardware forwarding engine rebuild image module 506. In one embodiment, hardware forwarding engine image module 502 updates the software image as described in FIG. 2 above. The protocol keep-alive image module 504 updates the software image as described in FIG. 3 above. The hardware forwarding engine rebuild image module 506 updates the software image as described in FIG. 4 above.

Figure 6:
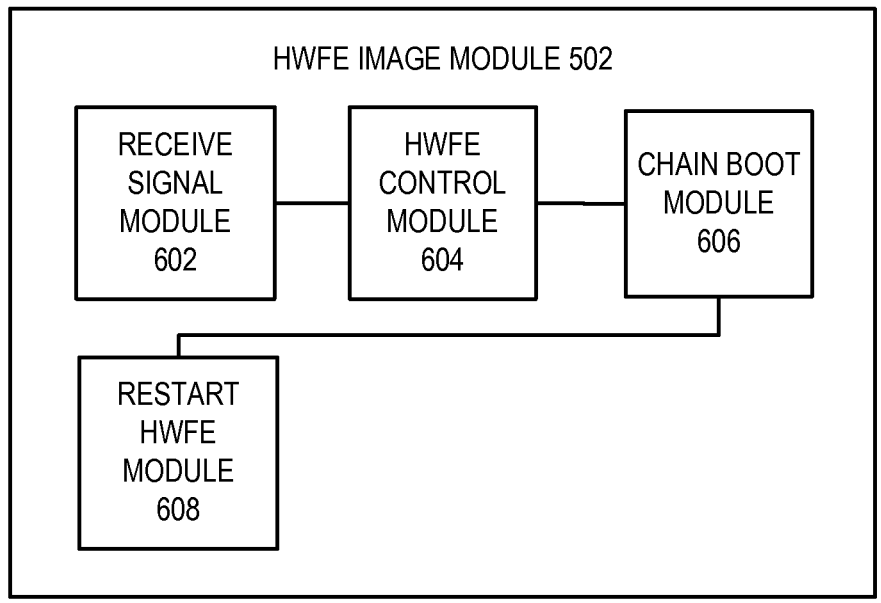
FIG. 6 is a block diagram of one embodiment of a hardware forwarding engine image module that updates a network element to a new software image by restarting the hardware forwarding engines.

FIG. 6 is a block diagram of one embodiment of a hardware forwarding engine image module 502 that updates a network element to a new software image by restarting the hardware forwarding engines. In one embodiment, the hardware forwarding engine image module 502 includes a receive signal module 602, hardware forwarding engine control module 604, chain boot module 606, and restart hardware forwarding engine module 608. In one embodiment, the receive signal module 602 receives a signal to update the software image as described in FIG. 2, block 202 above. The hardware forwarding engine control module 604 assumes control of the hardware forwarding engine(s) as described in FIG. 2, block 204 above. The chain boot module 606 boots the control plane to the new software image as described in FIG. 2, block 206 above. The restart hardware forwarding engine module 608 restarts the hardware forwarding engine as described in FIG. 2, block 208 above.

Figure 7:
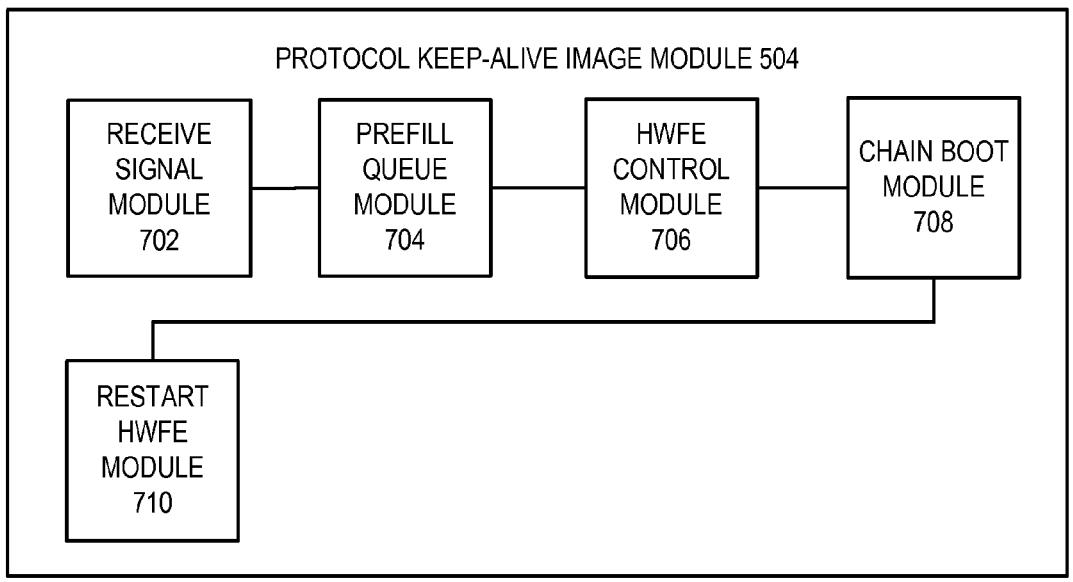
FIG. 7 is a block diagram of one embodiment of a protocol keep-alive image module that updates a network element to a new software image by prefilling a queue with keep-alive messages.

FIG. 7 is a block diagram of one embodiment of a protocol keep-alive image module 504 that updates a network element to a new software image by prefilling a queue with keep-alive messages. In one embodiment, the protocol keep-alive image module 504 includes a receive signal module 702, prefill queue module 704, hardware forwarding engine control module 706, chain boot module 708, and restart hardware forwarding engine module 710. In one embodiment, the receive signal module 702 receives a signal to update the software image as described in FIG. 3, block 302 above. The prefill queue module 704 prefills a queue with a keep-alive protocol as described in FIG. 3, block 304 above. The hardware forwarding engine control module 706 assumes control of the hardware forwarding engine(s) as described in FIG. 3, block 306 above. The chain boot module 708 boots the control plane to the new software image as described in FIG. 3, block 308 above. The restart hardware forwarding engine module 710 restarts the hardware forwarding engine as described in FIG. 3, block 310 above.

Figure 8:
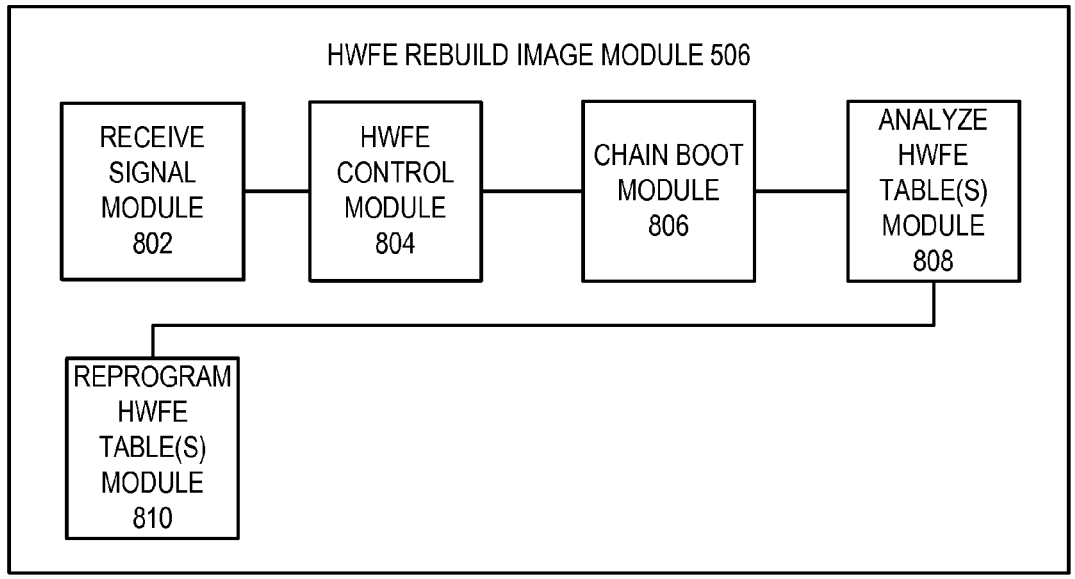
FIG. 8 is a block diagram of one embodiment of a hardware forwarding engine rebuild image module that updates a network element to a new software image by reprogramming the tables of the hardware forwarding engines.

FIG. 8 is a block diagram of one embodiment of a hardware forwarding engine rebuild image module 506 that updates a network element to a new software image by reprogramming the tables of the hardware forwarding engines. In one embodiment, the hardware forwarding engine rebuild image module 506 includes a receive signal module 802, hardware forwarding engine control module 804, chain boot module 806, analyze hardware forwarding engine table module 808, and reprogram hardware forwarding engine table module 810. In one embodiment, the receive signal module 802 receives a signal to update the software image as described in FIG. 4, block 402 above. The hardware forwarding engine control module 804 assumes control of the hardware forwarding engine(s) as described in FIG. 4, block 404 above. The chain boot module 806 boots the control plane to the new software image as described in FIG. 4, block 406 above. The analyze hardware forwarding engine table module 808 analyzes the hardware forwarding engine table(s) as described in FIG. 4, block 410 above. The reprogram hardware forwarding engine table module 810 reprograms the hardware forwarding engine table(s) as described in FIG. 4, block 412 above.

Figure 9:
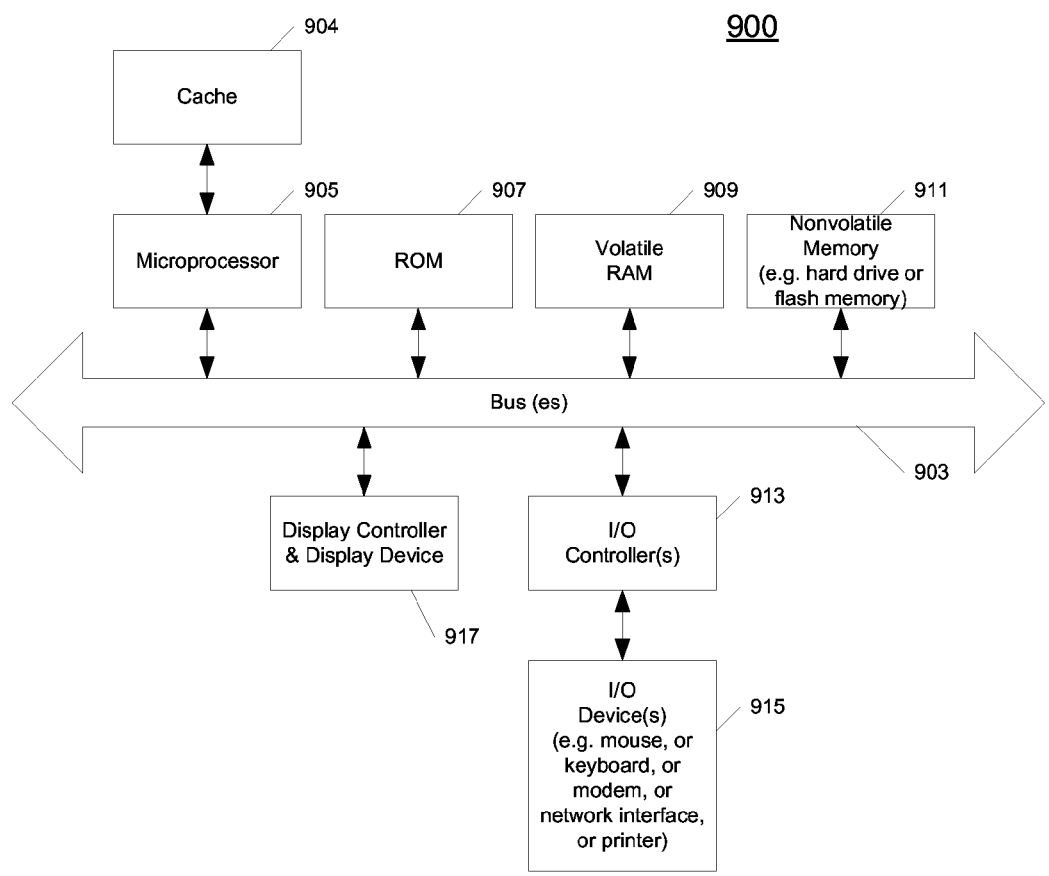
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a network element 100 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
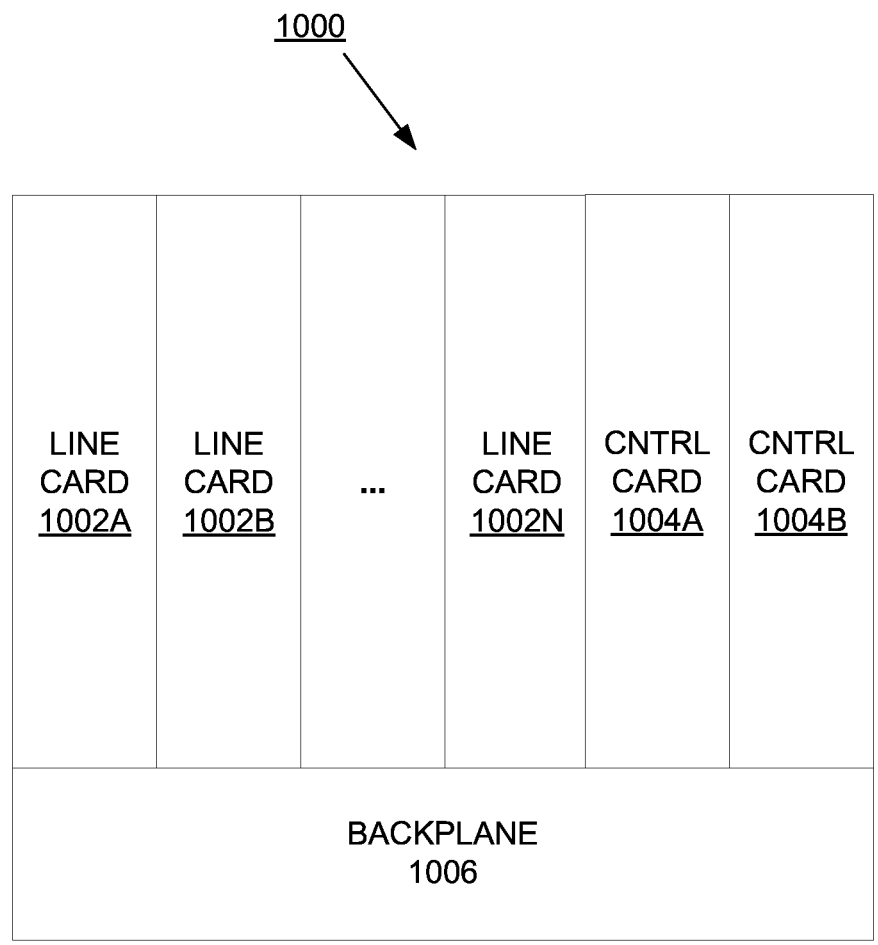
FIG. 10 is a block diagram of one embodiment of an exemplary network element that updates the network element to a new software image.

FIG. 10 is a block diagram of one embodiment of an exemplary network element 1000 that updates a software image on the network element. In FIG. 10, the backplane 1006 couples to the line cards 1002A-N and controller cards 1004A-B. While in one embodiment, the controller cards 1004A-B control the processing of the traffic by the line cards 1002A-N, in alternate embodiments, the controller cards 1004A-B, perform the same and/or different functions (e.g., updating a software image on the network element, etc.). In one embodiment, the line cards 1002A-N process and forward traffic according to the network policies received from the controller cards 1004A-B. In one embodiment, the controller cards 1004A-B update a software image on the network element as described above in FIGS. 2-4. In this embodiment, one or both of the controller cards include modules to update a software image on the network element, such as the image update module 122 as described in FIG. 5, respectively above. It should be understood that the architecture of the network element 1000 illustrated in FIG. 10 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "booting," "determining," "restarting," "assuming," "prefilling," "identifying," "updating," "re-programming," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to update a network element with a new software image, the method comprising:
   receiving a signal to update the network element with the new software image, wherein the network element includes a plurality of hardware forwarding engines and a control plane;
   chain booting the control plane with the new software image, wherein the chain booting is accomplished without restarting the hardware forwarding engines; and
   restarting the plurality of hardware forwarding engines after the control plane has completed booting the new software image.

2. The non-transitory machine-readable medium of claim 1, further comprising:
   assuming control of the plurality of hardware forwarding engines.

3. The non-transitory machine-readable medium of claim 1, wherein the booting of the control plane is a chain boot from a current software image to the new software image.

4. The non-transitory machine-readable medium of claim 1, wherein the new software image is a different version of the current software image.

5. The non-transitory machine-readable medium of claim 1, further comprising:
   prefilling a queue in the hardware forwarding engines with a keep-alive message for a network service prior to chain booting of the control plane.

6. The non-transitory machine-readable medium of claim 5, further comprising:
   identifying the network service as a service that uses the keep-alive message.

7. The non-transitory machine-readable medium of claim 6, wherein the network service will send a keep-alive message during the time period in which the control plan is chain booting the new software image.

8. The non-transitory machine-readable medium of claim 5, wherein the keep-alive message is a message sent by one device to another device to check that the network service between the two devices is operating.

9. The non-transitory machine-readable medium of claim 5, wherein the keep-alive message is transmitted during the time in which the control plane is restarting.

10. A non-transitory machine-readable medium having executable instructions to cause one or more processing units perform a method to update a network element with a new software image, the method comprising:
    receiving a signal to update the network element with the new software image, wherein the network element includes a plurality of hardware forwarding engines, a data plane, and a control plane;
    booting the control plane with the new software image, wherein the booting is accomplished without restarting the hardware forwarding engines and the booting of the control plane is a chain boot from a current software image to the new software image; and
    updating the plurality of hardware forwarding engines, wherein the updating occurs without an interruption to a network processing function of the data plane.

11. The non-transitory machine-readable medium of claim 10, wherein the updating of the plurality of hardware forwarding engines comprises:
    analyzing a hardware table of one of the hardware forwarding engines; and
    re-programming the hardware table using the new software image based on the analysis.

12. The non-transitory machine-readable medium of claim 11, wherein the analyzing comprises:
    analyzing the hardware table for content and structure of the hardware table.

13. A method to update a network element with a new software image, the method comprising:
    receiving a signal to update the network element with the new software image, wherein the network element includes a plurality of hardware forwarding engines and a control plane;
    booting the control plane with the new software image, wherein the booting is accomplished without restarting the hardware forwarding engines and the booting of the control plane is a chain boot from a current software image to the new software image; and restarting the plurality of hardware forwarding engines after the control plane has completed booting the new software image with the new software image.

14. The method of claim 13, further comprising:
assuming control of the plurality of hardware forwarding engines.

15. The method of claim 13, wherein the new software image is a different version of the current software image.

16. The method of claim 13, further comprising:
prefilling a queue in a hardware forwarding engines with a keep-alive message for a network service.

17. The method of claim 16, further comprising:
identifying the network service as a service that uses the keep-alive message.

18. The method of claim 17, wherein the network service will send a keep-alive message during the time period in which the control plane is rebooting.

19. A network element comprising:
a new software image;
a plurality of hardware forwarding engines; and
a control plane, coupled to the plurality of hardware forwarding engines, that updates the network element with the new software image, the control plane including,
a receive signal module, wherein the receive signal module receives a signal to update the network element with the new software image,
a chain boot module, coupled to the receive signal module, wherein chain boot module chain boots the control plane with the new software image and the booting is accomplished without restarting the plurality of hardware forwarding engines, and
a restart hardware forwarding engine module, coupled to the chain boot module, wherein the restart hardware forwarding engine restarts the plurality of hardware forwarding engines.

20. A method to update a network element with a new software image, the method comprising:
receiving a signal to update the network element with the new software image, wherein the network element includes a plurality of hardware forwarding engines, a data plane, and a control plane;
booting the control plane with the new software image, wherein the booting is accomplished without restarting the hardware forwarding engines and the booting of the control plane is a chain boot from a current software image to the new software image; and
updating the plurality of hardware forwarding engines, wherein the updating occurs without an interruption to a network processing function of the data plane.

21. A network element comprising:
a new software image;
a plurality of hardware forwarding engines; and
a control plane, coupled to the plurality of hardware forwarding engines, that updates the network element with the new software image, the control plane including,
a receive signal module, wherein the receive signal module receives a signal to update the network element with the new software image,
a chain boot module, coupled to the receive signal module, wherein chain boot module chain boots the control plane with the new software image and the booting is accomplished without restarting the plurality of hardware forwarding engines, and
a rebuild image hardware forwarding engine module, coupled to the chain boot module, wherein the rebuild image hardware forwarding engine updates the plurality of hardware forwarding engines, wherein the updating occurs without an interruption to a network processing function of the data plane.

* * * * *